(12) United States Patent
Gutierrez

(10) Patent No.: US 8,704,141 B2
(45) Date of Patent: Apr. 22, 2014

(54) INDUCTION COOKING HEATER AND METHOD FOR THE CONTROL THEREOF

(75) Inventor: Diego Neftali Gutierrez, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 386 days.

(21) Appl. No.: 12/687,292

(22) Filed: Jan. 14, 2010

(65) Prior Publication Data

US 2010/0181300 A1    Jul. 22, 2010

(30) Foreign Application Priority Data

Jan. 16, 2009    (EP) ...................................... 09150707

(51) Int. Cl.
 *H05B 6/12*    (2006.01)
(52) U.S. Cl.
 USPC .......................................... 219/627; 219/667
(58) Field of Classification Search
 USPC ................. 219/660, 662, 608, 627, 664, 667; 336/84 M; 324/203, 207.21; 374/177
 See application file for complete search history.

(56) References Cited

U.S. PATENT DOCUMENTS

| | | | | |
|---|---|---|---|---|
| 4,629,843 A | * | 12/1986 | Kato et al. | 219/624 |
| 4,769,519 A | | 9/1988 | Hall | |
| 5,665,263 A | * | 9/1997 | Gaspard | 219/625 |
| 6,566,636 B1 | * | 5/2003 | Bentley et al. | 219/665 |
| 2002/0063124 A1 | * | 5/2002 | Clothier et al. | 219/622 |
| 2004/0245244 A1 | * | 12/2004 | Hirota et al. | 219/624 |
| 2006/0237450 A1 | * | 10/2006 | Uchida et al. | 219/662 |
| 2008/0121633 A1 | * | 5/2008 | Pinilla et al. | 219/494 |
| 2008/0223852 A1 | * | 9/2008 | Bassill et al. | 219/647 |
| 2009/0260616 A1 | * | 10/2009 | Brant et al. | 126/299 D |

FOREIGN PATENT DOCUMENTS

| | | |
|---|---|---|
| EP | 0713350 A1 | 5/1996 |
| JP | 2005528594 | * 10/2005 |

OTHER PUBLICATIONS

Translation of JP2005-285594A (Oct. 2005), 5 pages.*
European search report for corresponding EP09150707.9, Aug. 19, 2009.

* cited by examiner

*Primary Examiner* — Caridad Everhart

(57) ABSTRACT

An induction cooking heater having at least one inductor and ferrite bars as magnetic field concentrators located beneath the inductor comprises a sensing circuit associated to the ferrite bars and adapted to monitor at least one electric parameter of the sensing circuit in order to prevent the ferrite bars from reaching the Curie point temperature.

11 Claims, 7 Drawing Sheets

INDUCTION COOKING HEATER AND METHOD FOR THE CONTROL THEREOF

BACKGROUND OF THE INVENTION

1. Field of the Invention

The present invention relates to an induction cooking heater of the type comprising at least one inductor and magnetic field concentrator located beneath the inductor.

2. Description of the Related Art

Induction cooking heaters use half-bridge converters for supplying the load composed of the system induction coil+ cooking vessel in series with two parallel resonant capacitors. As indicated in the attached FIG. 1, the power transistors commutate the rectified line voltage and output it to a RLC load circuit, which is the equivalent electrical model of the series connection of coil-pot and resonance capacitor.

The magnetic coupling of the coil-pot assembly can be modelled as a transformer with two secondary windings: one corresponds to the pot bottom and the second one corresponds to the magnetic field concentrator, usually in the form of ferrite bars or the like placed beneath the induction coil. The main function of these ferrite bars is to focus (i.e. concentrate) the magnetic field lines generated by the inductor and prevent them to pass through the aluminium plate support.

In the attached FIG. 2 it is shown a cross section of a usual induction heating cooktop, where the magnetic field vectors are schematically shown.

Based on the Ampere Law:

$$\sum_{area} I = \oint H * dl$$

the equivalent electrical model of the coil-pot assembly is shown in FIGS. 3 and 4.

As the ferrite bars concatenate the electro-magnetic fields generated by coil current of the induction heating half bridge converter, they start self-heating due to (mainly) the hysteresis energy loss.

The hysteresis power loss depends on frequency, the ferrite volumes and the maximum magnetic field B, as described in the below empirical Steinmetz equation:

$$P_{hyst} = K_h * f * B_{max}^\alpha$$

The magnetic relative permeability changes non-linearly with the temperature at ferrite core.

FIG. 5 shows relative permeability vs. temperature curve of a standard commercial ferrite used for coil inductors. As shown in the figure, the relative permeability increases with temperature and reaches maximum temperature at around 225° C.

At that point, if power is not reduced and ferrite bars keep on self-heating, they may reach the Curie-point temperature at which any ferromagnetic material becomes paramagnetic, and so it becomes "transparent" to magnetic field (i.e. the relative permeability "collapses"). Then, being the ferrites "transparent" for magnetic fields, this magnetic field will pass through the aluminium plate support, which is a highly electrical conductive non-magnetic material. Induced current starts flowing through the aluminium plate.

This sharp transition from ferromagnetic to paramagnetic characteristic changes the equivalent electrical model of the coil load as seen from the power converter side: the electrical complex impedance at coil terminals is reduced considerably. Somehow, it would be as the magnetic inductance is short-circuited. Then the reactive and resistive part of the complex impedance of the load (inductor coil–pot assembly) will be equal to the dispersion inductance and coil winding resistance.

This new equivalent impedance load seen at coil terminals is connected in series with the resonant capacitors: the total impedance supplied with commutated rectified line voltage (whose fundamental voltage component is equal to 93.2 Vrms when line voltage is 230 Vrms) is too small and that makes the output current rises sharply.

These working conditions should be avoided before reaching them by reducing the output power. In the case of standard induction heating cookers, if such condition is not early detected, then the power transistors of half bridge converter might fail due to the high current during conduction time.

There are several ways of detecting it, for instance today a standard method measures the ratio of maximum current and rms (root mean square) current and compare it with a predefined threshold value. As can be seen in the figures, normally the phenomenon of inductor ferrite saturation starts at the peak of output commutated voltage (that corresponds in time with line voltage peak). The peak loss power that is dissipated by ferrite cores at these points is enough for heating the ferrite up to Curie-point (becoming it paramagnetic).

Once the output commutated voltage amplitude is lower than a certain value, the ferrite core cools down and its relative permeability "recovers" the value previous to saturation. This phenomenon can be detected easily by measuring the coil current. This method is also disclosed by U.S. Pat. No. 5,665, 263 where controls are provided for detecting the surge of current flowing into the inductor when the ferrite bars have reached magnetic saturation.

Also EP-A-209215 discloses a temperature regulating apparatus that includes sensing coil for monitoring the change in permeability that occurs when a ferromagnetic element has reached its Curie temperature, the power cut-off or reduction being carried out only after this detection. The above method needs to supply constant ac voltage or constant power to the sensing coils which might increase the cost of the hardware components and it cannot be applied in other areas as induction heating cooktops where the load to be heated cannot be wound around by sensing coils.

The above known methods needs that ferrite saturation happens (and so related over current). Moreover according to these known methods it is not possible to assess which are the optimum working conditions where ferrite bars are heated up to the temperature closer to the Curie-point where relative permeability has still an acceptable value controlling the output power so as to avoiding the saturation of the ferrites.

SUMMARY OF THE INVENTION

It is an aspect of the present invention to provide an induction cooking heater which does not present the above-mentioned drawbacks and which is simple and economical to be produced.

The above aspect is reached thanks to the features listed in the appended claims.

The basic idea underlying the present invention is to anticipate in advance that the ferrites cores temperature is reaching the Curie-point temperature and to reduce the power accordingly so as to avoid actual ferrite saturation. This method is carried out by sensing directly the magnetic flux that passes through the ferrite core. Several kinds of sensors can be used, for instance simple pick-up coils wound around the ferrite bars. A magnetic flux sensor can be implemented by wrapping wires around the inductor ferrite and measuring the output voltage signal.

BRIEF DESCRIPTION OF THE DRAWINGS

Further details and advantages of the present invention will become clear from the following detailed description, with reference to the attached drawings, in which.

DETAILED DESCRIPTION OF THE PREFERRED EMBODIMENTS

Figure 1:
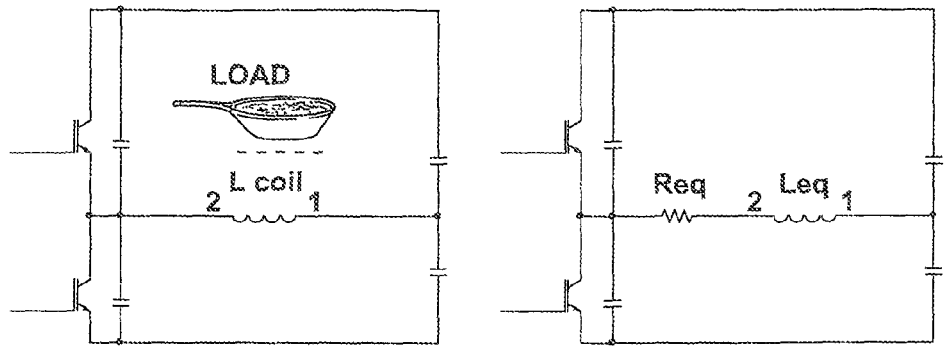
FIG. 1 shows a half-bridge converter of known type and the equivalent electrical model thereof.
Figure 2:
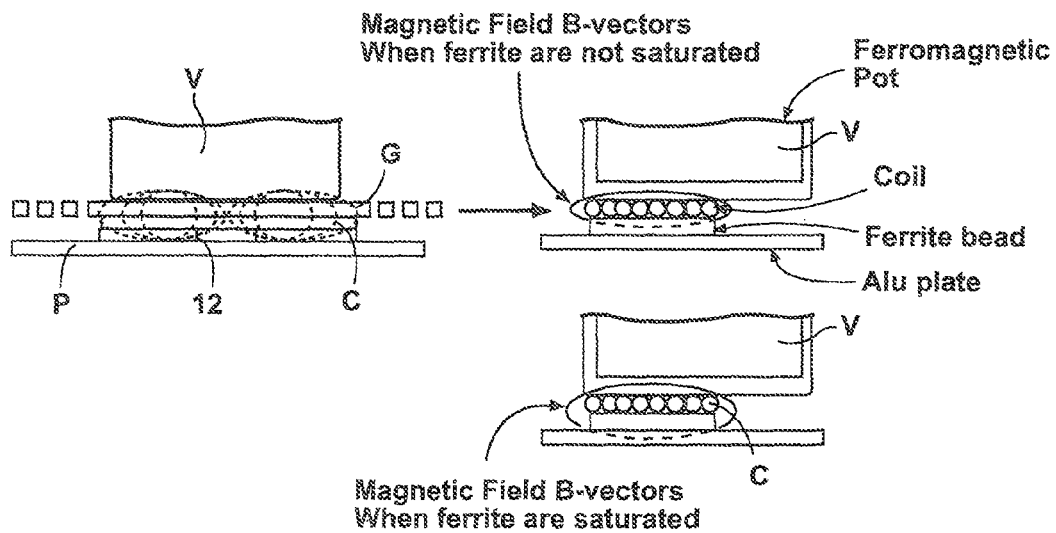
FIG. 2 shows a cross section of a known induction heating cooktop, where magnetic field vectors are shown when the ferrite temperature is under or over the Curie-point.
Figure 3:
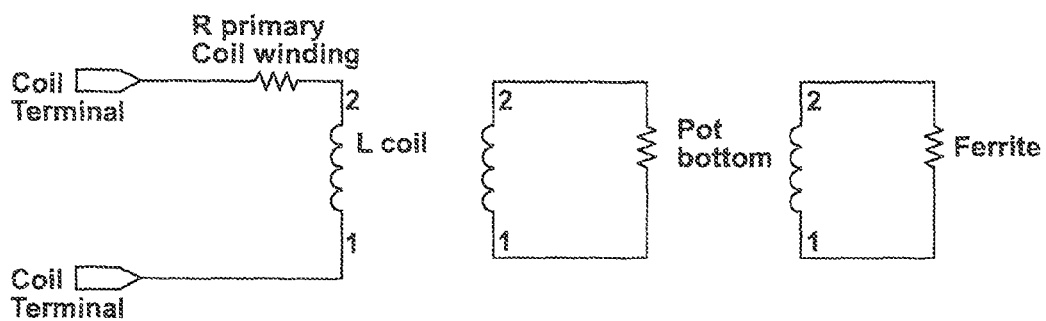
FIGS. 3-4 show the equivalent electrical models of the induction coil+pot assembly.
Figure 4:
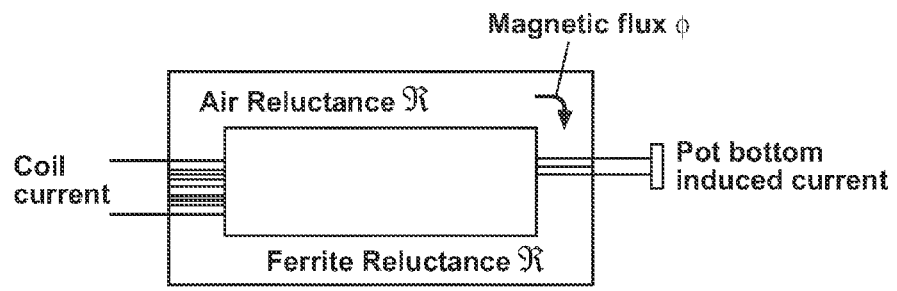
Figure 5:
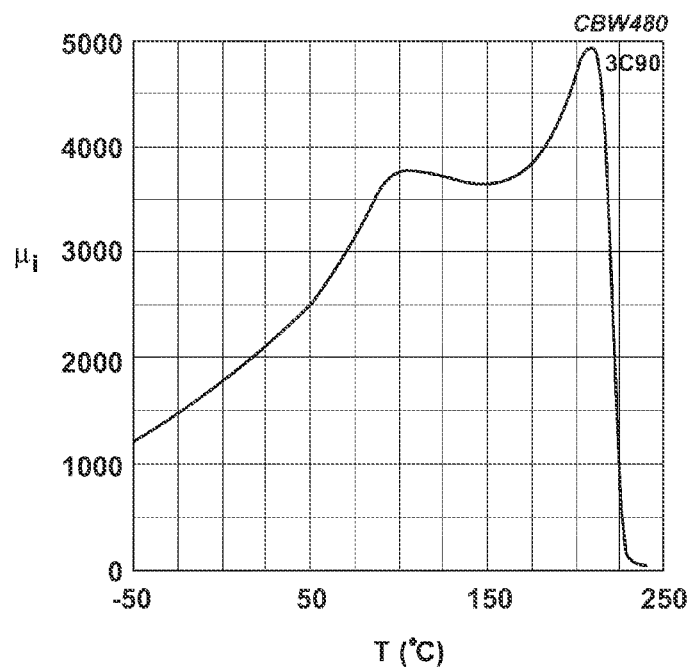
FIG. 5 shows relative permeability of a ferrite material vs. temperature.

According to the disclosure, a signal conditioning circuit 10 as simple as voltage peak detector circuit (FIG. 6) is enough for sensing the relative permeability variation due to temperature.

The sensing circuit 10 comprises a wire 10a wrapped around a ferrite bar 12 which is one of the bars placed beneath an induction coil C placed under a glass surface G on which a cooking vessel V is supported. Ferrite bars are made of non-conductive ferromagnetic ceramic compound derived from iron oxides as well as oxides of other metals. Under ferrite bars 12 an aluminium plate P is placed for closing from the bottom the induction heating system hardware.

The voltage Vm induced on the wire 10a wrapped around the ferrite 12 is proportional to the magnetic field variation, according to Faraday's law (N being the number of turns of wire):

$$v_m = -N \frac{d\Phi_B}{dt}$$

Considering that the flux variation vs. time resembles a sinusoidal waveform, the amplitude of Vm is proportional to the max flux that passes through the ferrites core:

$$\Phi_b(t) = \Phi^* \sin(2\pi f_{igbt} t); v_m = -N^* \Phi^* 2\pi f_{igbt}^* \sin(2\pi f_{igbt} t);$$

$$v_m \alpha \Phi$$

Flux can be expressed as in terms of self-inductance:

$$\phi = L^* i$$

And self-inductance is inversely proportional to the magnetic reluctance and directly proportional to the relative permeability:

$$L = \frac{N^2}{R}$$

$$R = \frac{length}{\mu_r * \mu_o * Area}$$

$$\mu_o = 4\pi * 10^{-7} [N * A^{-2}]$$

Thus, the $V_m$ is directly proportional to µrel when the relative permeability µrel changes due to temperature variation, then (as a consequence) the output voltage amplitude increases (if, µrel increases) or decreases accordingly.

Figure 7:
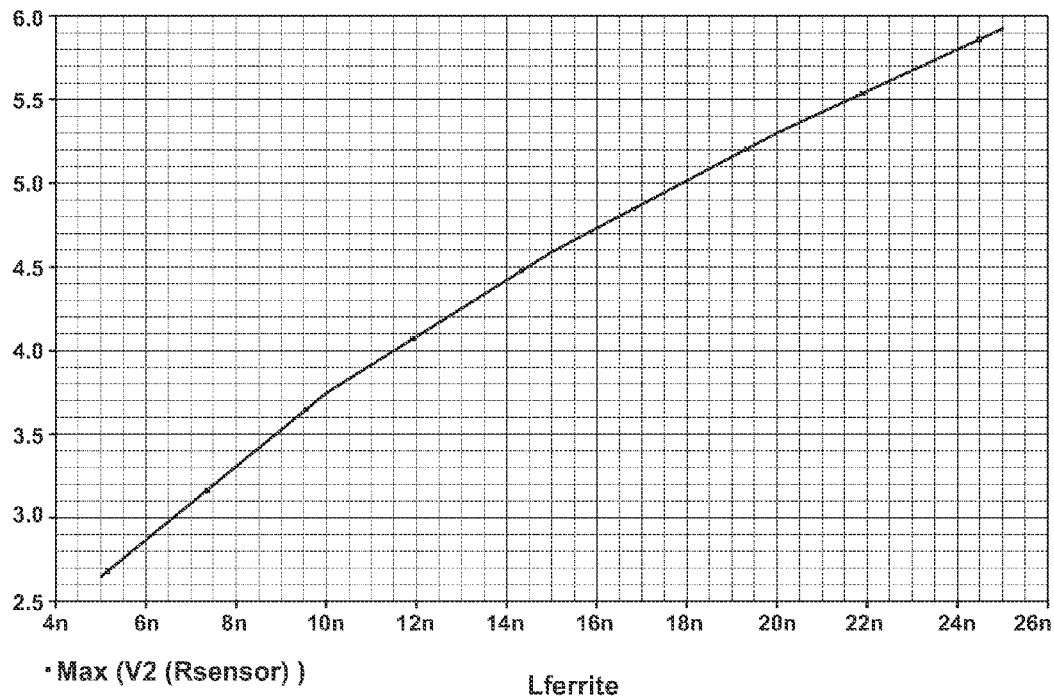
FIG. 7 shows the relationship curve of the peak voltage vs. relative permeability, measured from the pick-up coil of FIG. 6.
Figure 8:
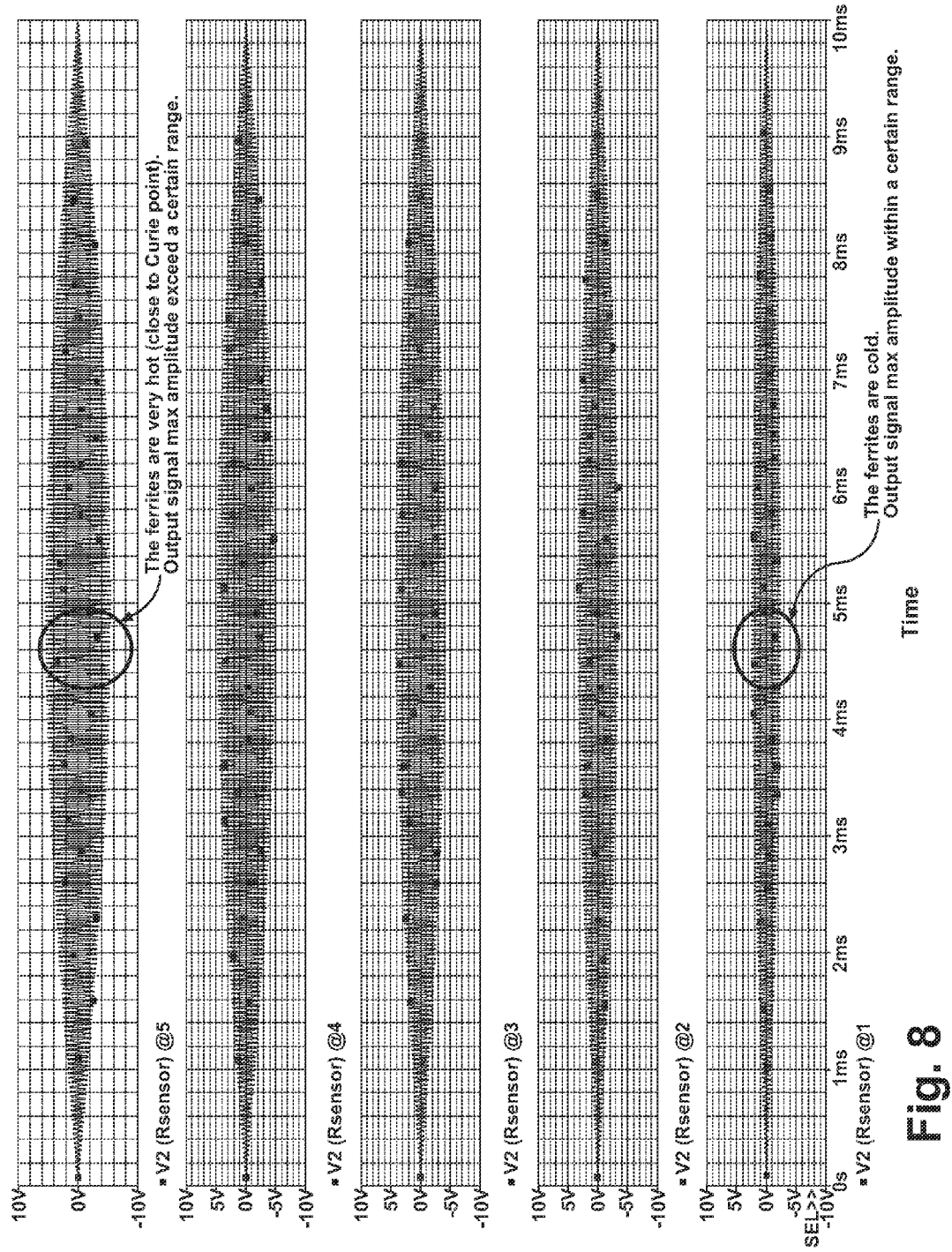
FIG. 8 shows some diagrams with voltage peak variation vs. relative permeability variation.

In FIG. 7 there is shown the curve of pick-up coil output voltage peak vs. relative permeability variation. Furthermore, in FIG. 8 it is shown the output voltage waveform vs. time at different relative permeability of the ferrite cores.

Figure 9:
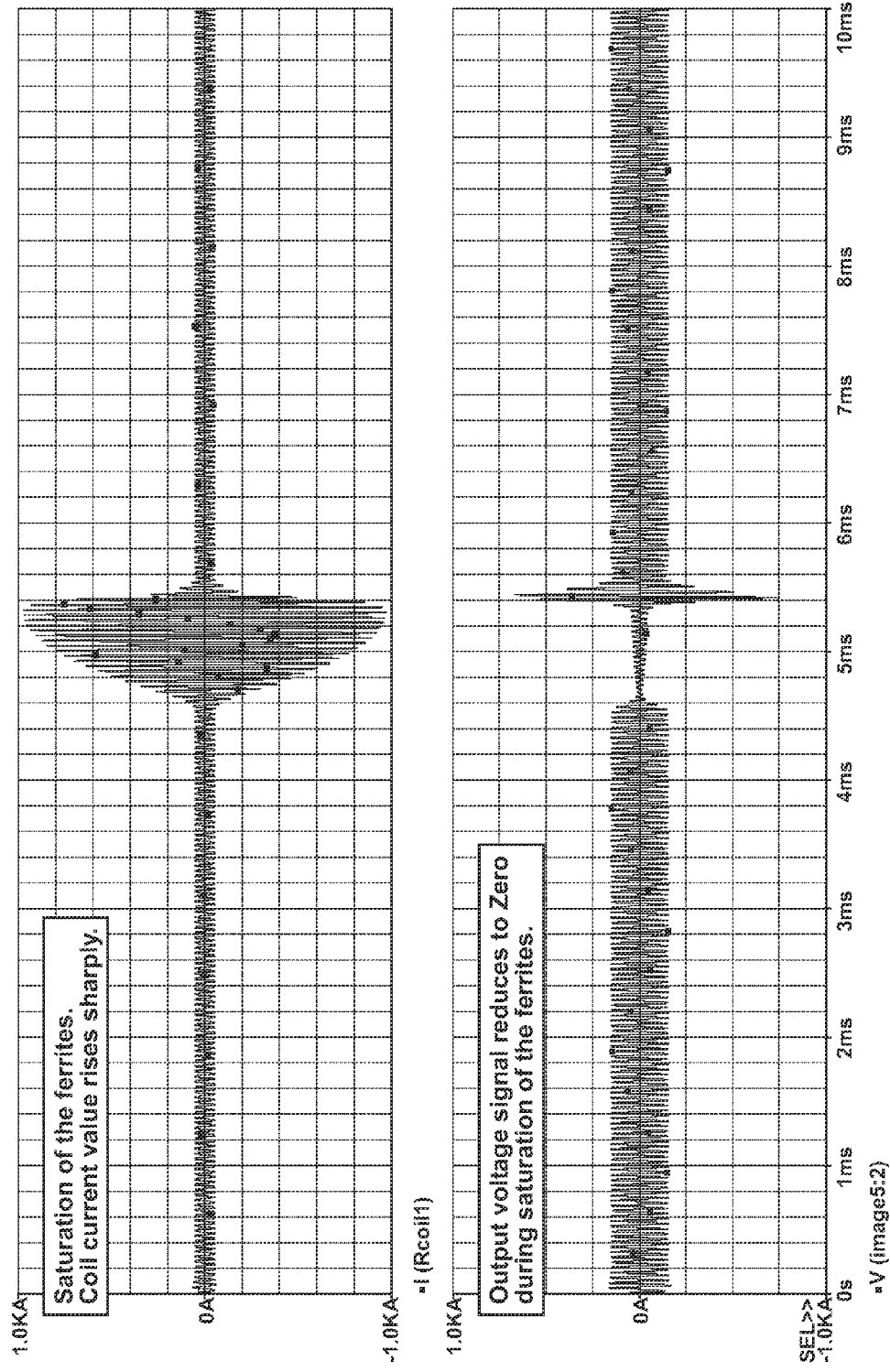
FIG. 9 shows two diagrams on how coil current and voltage signal change respectively if Curie point temperature is reached.

Consequently, once Curie-point temperature is reached the output voltage falls to zero as flux variation within the ferrite is zero (as the material becomes paramagnetic). An example is shown in FIG. 9.

Figure 6:
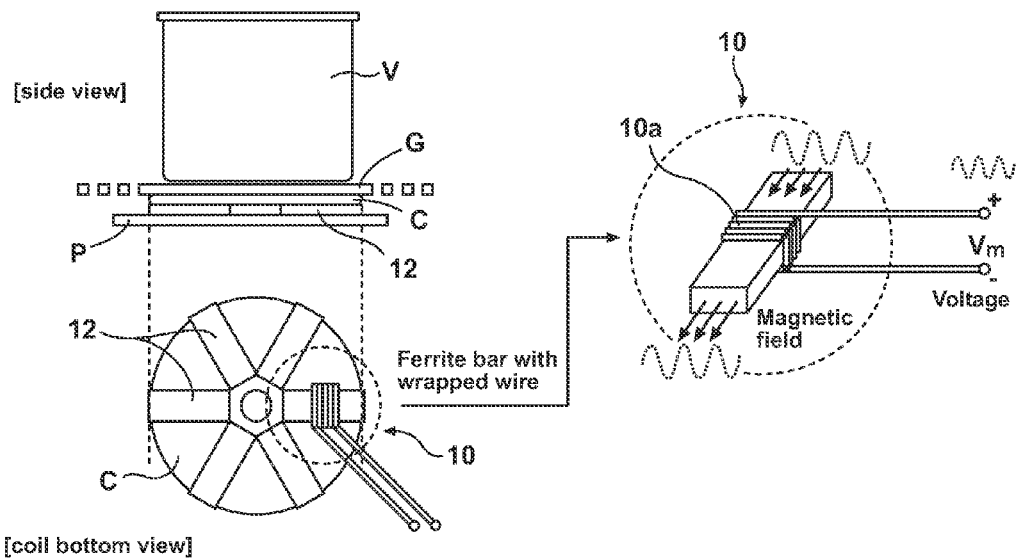
FIG. 6 shows a circuit sensor according to the invention, associated to a ferrite bar.

This voltage variation can be sensed directly with voltage peak detector circuit as shown in FIG. 6. However, other signal conditioning circuit that measure values related to Vm amplitude (like for example the rms Vm) can be used.

Figure 10:
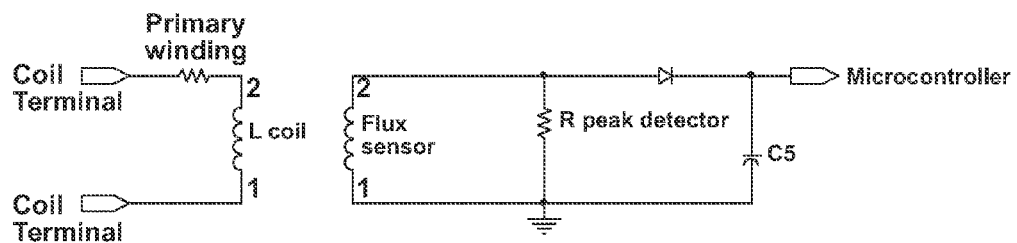
FIG. 10 shows a sensor circuit according to the invention in a second embodiment thereof.

Else more, these values can be calculated directly using the AD converter available in today microcontroller, as shown in FIG. 10.

The device of the present disclosure senses in advance that the temperature of the magnetic field concentrators, usually ferrite bars, is reaching the Curie-point temperature, where the ferrite relative permeability reduces to zero. In this way the induction heating control may reduce the output power so as to reduce the hysteresis loss energy within the ferrite preventing them from self-heating. As a consequence, potential dangerous working conditions that stress power transistors of the half bridge can be avoided sooner than with today standard safety algorithm, prolonging the useful life of the power transistors.

Figure 11:
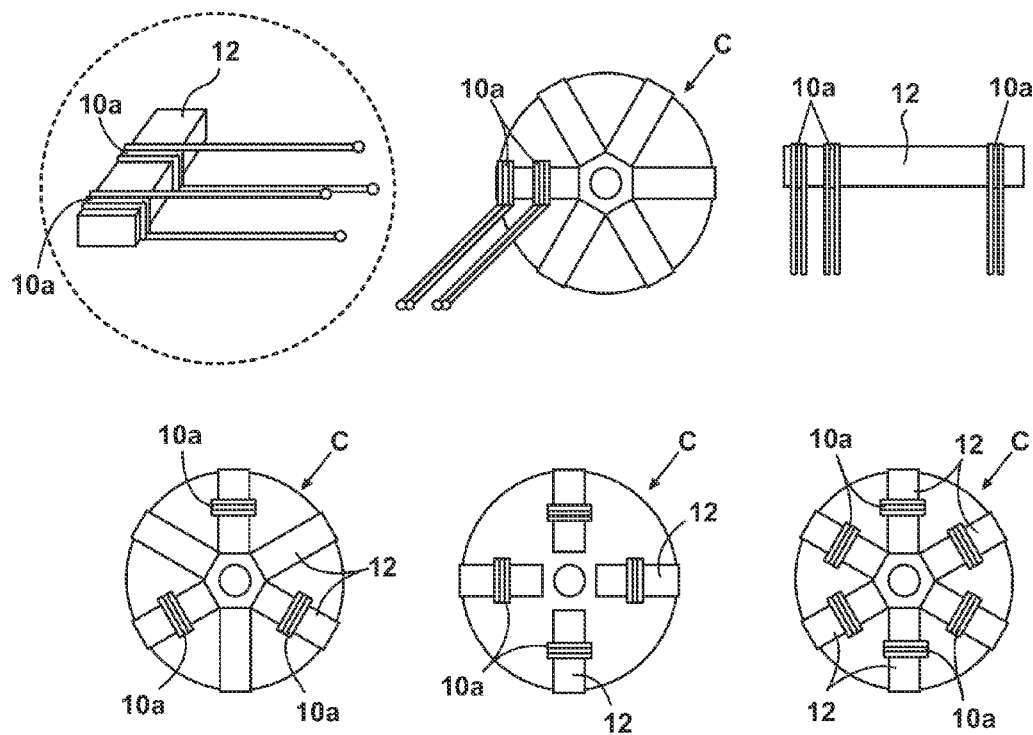
FIG. 11 shows some examples where circuit sensors of FIG. 6 are used twice or more for each ferrite bar, and where more than one ferrite bar, for each heating zone, is provided with a circuit sensor.

Moreover, another example of application that will improve the robustness of the invention is to apply the several sensors throughout one single ferrite bar so as to detect better where ferrite saturation occurs. This example is shown in the upper part of FIG. 11. Moreover (low portion of FIG. 11), the ferrites wound with pick-up coil 10a can be more than one for each induction coil in order to cover more than one axis on the induction hob zone.

These examples of application (that uses more that one pick-up coil) are more robust against external factor as, for instance, the position of the pot respect the induction coil.

Figure 12A:
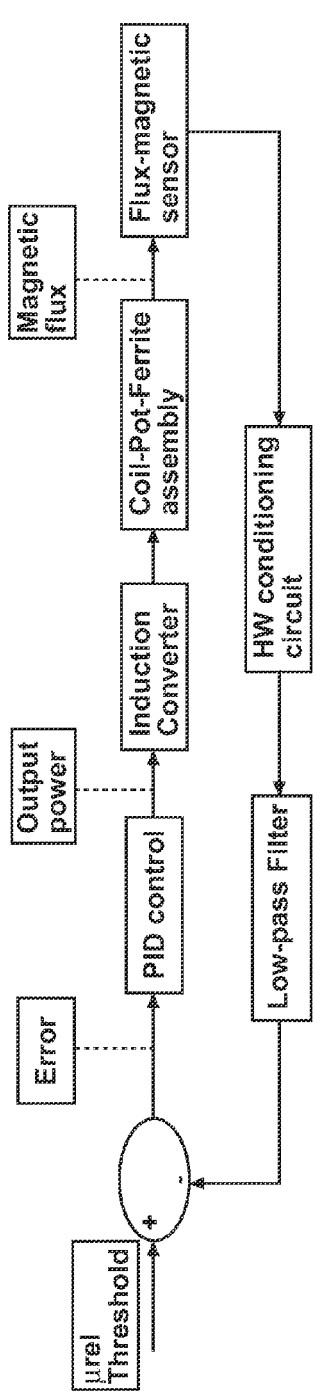
FIGS. 12a and 12b are block diagrams for an induction cooking heater according to the invention, where the set point is a predefined relative permeability and the zero gradient of the sensor signal vs. time respectively.

In FIG. 12a it can be shown an example of the above control, the output signal of the hardware conditioning circuit, attached to the sensing coil, being connected to a comparator, which compares it with a constant value related to a predefined relative permeability. Whenever the instant value measured by the sensing coil, the output power is reduced as determined by a PID-type control which actuates an output power so as to reduce the error to zero.

Figure 12B:
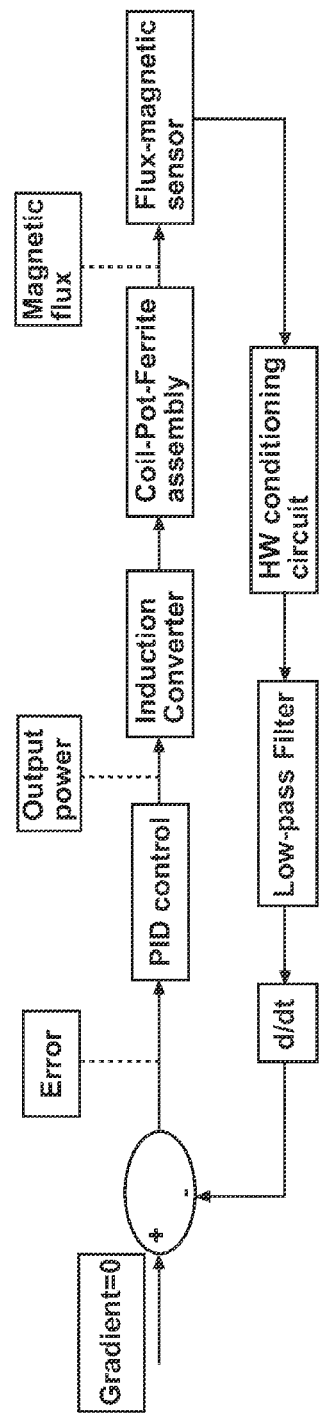

Another type of control that can be applied to the sensor output signal is a control that tracks the gradient of the sensor signal vs. time in order to detect its maximum, i.e. the moment when the signal gradient goes to zero and reduce the power so as to keeps the relative permeability at its maximum possible value, just below the Curie-point temperature. In FIG. 12b it is shown the above application.

Being able to work close to the limit at which ferrite core temperature is almost equal to the Curie-point temperature is another advantage if compared to present solutions, because it increases the safe operation area of the induction heating half-bridge converter. Therefore the overall performance of the induction heating half-bridge converter increases.

This disclosure discloses an embodiment of the invention, the present invention may be used also with different configurations of the power converters according to the appended claims.

The invention claimed is:

1. An induction cooking heater comprising:
an inductor,
a magnetic field concentrator including a plurality of ferrite bars located beneath the inductor, and
a sensing circuit including a coil wound around at least one of the plurality of ferrite bars associated with the magnetic field concentrator,
wherein, during operation of the induction cooking heater, the sensing circuit is adapted to monitor at least one electric parameter of the sensing circuit in order to sense a magnetic flux passing through the magnetic field concentrator and anticipate, based on the magnetic flux, when a temperature of the magnetic field concentrator is reaching a Curie point temperature in order to prevent the temperature of the magnetic field concentrator from reaching the Curie point temperature and to prevent magnetic saturation of the magnetic field concentrator.

2. The induction cooking heater according to claim 1 further comprising additional sensing circuits applied at several positions along the at least one of the ferrite bars or on more than one of the plurality of ferrite bars associated with the inductor.

3. The induction cooking heater, according to claim 1, further comprising a comparator for comparing the electrical parameter to a constant value based on the relative permeability of the magnetic field concentrator to produce a control signal whereby the current supplied to the inductor is controlled based on the control signal.

4. The induction cooking heater according to claim 1, wherein the sensing circuit is configured to determine a gradient of the electrical parameter and control the current supplied to the inductor based on the gradient.

5. The induction cooking heater according to claim 1, wherein the at least one electrical parameter monitored by the sensing circuit is a voltage parameter.

6. The induction cooking heater according to claim 5, wherein the sensing circuit comprises a voltage peak detector circuit.

7. The induction cooking heater according to claim 5, wherein the sensing circuit comprises an AD converter.

8. A method for controlling an induction cooking heater having one inductor, a generator delivering a high-frequency current to supply the inductor and a magnetic field concentrator beneath the inductor, comprising the steps of:
monitoring an electrical parameter of the sensing circuit associated with the magnetic field concentrator to sense a magnetic flux in the magnetic field concentrator;
anticipating, based on the magnetic flux, when a temperature of the magnetic field concentrator is reaching a Curie point temperature;
preventing the temperature of the magnetic field concentrator from reaching the Curie point temperature; and
preventing magnetic saturation of the magnetic field concentrator.

9. The method according to claim 8, wherein monitoring the electrical parameter includes monitoring voltage passing through the circuit.

10. The method according to claim 8, further comprising:
comparing the electrical parameter to a constant value based on the relative permeability of the magnetic field concentrator to produce a control signal; and
controlling the current supplied to the inductor based on the control signal.

11. The method according to claim 8, further comprising:
determining a gradient of the electrical parameter; and
controlling the current supplied to the inductor based on the gradient.

* * * * *